United States Patent Office 3,265,446
Patented August 9, 1966

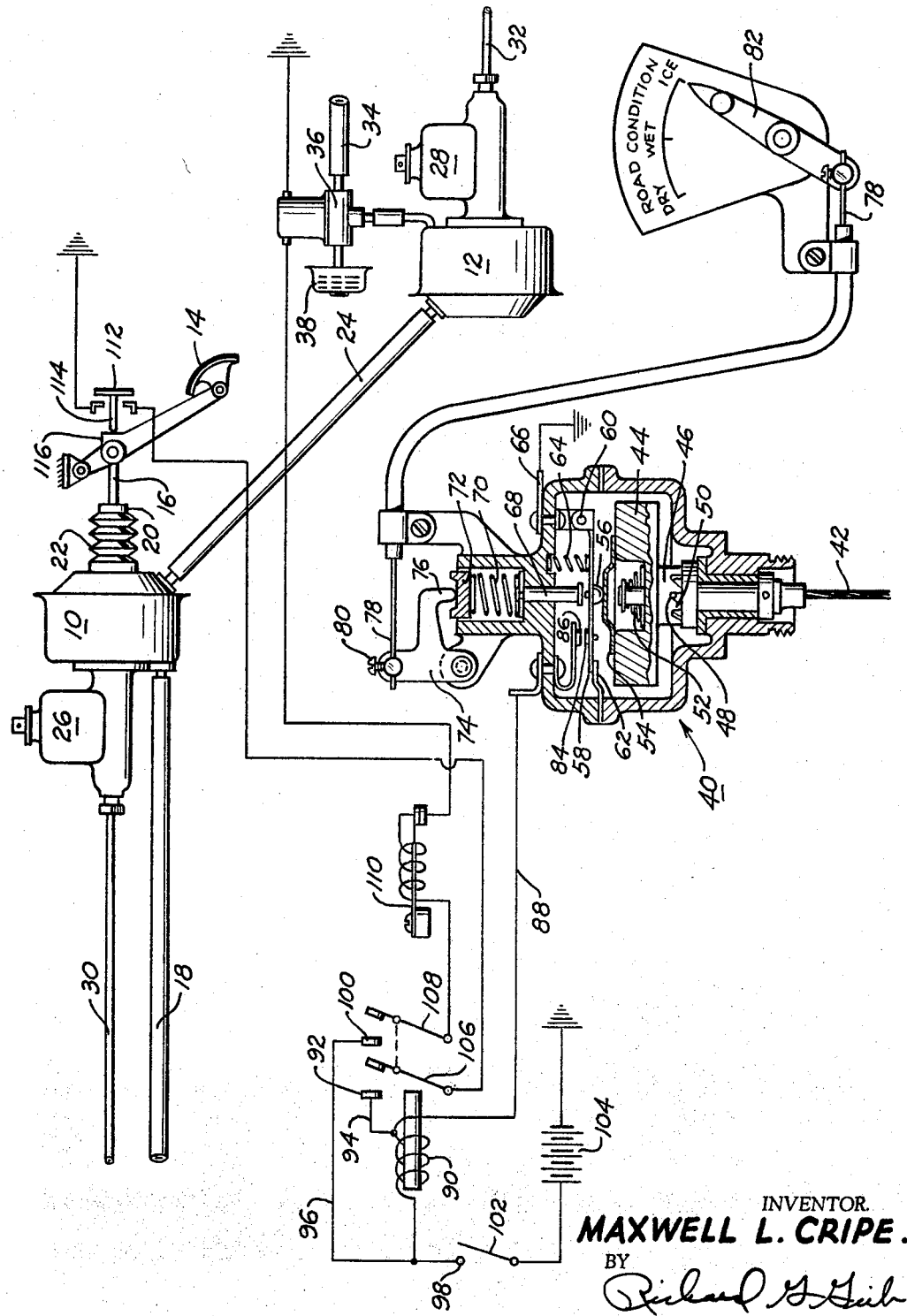

3,265,446
BRAKING SYSTEM WITH INTERMITTENT ANTI-SKID DEVICE
Maxwell L. Cripe, South Bend, Ind., assignor to The Bendix Corporation, South Bend, Ind., a corporation of Delaware
Filed June 12, 1963, Ser. No. 287,431
3 Claims. (Cl. 303—21)

This invention relates to a means for assembling an anti-skid brake system.

An object of this invention is, therefore, to provide a simple and effective operating means preventing any premature and undesirable locking of the brakes of a conveyance such as an automobile or aircraft.

A further object of my invention is to modulate a power brake system by an inertia mechanism whereby braking may be accomplished by intermittent actuation.

A still further object of my invention is to provide an inertia means for controlling the braking of a vehicle, which inertia means is adjustable in accordance with the conditions of the surface on which one is operating.

Other objects and advantages of the invention will become apparent during the course of the following description of the accompanying drawing showing my anti-skid control unit in section with an electrical system to control a power brake system.

With more particular reference to the drawing, I show a brake system employing two power brake actuators 10 and 12 for the associated vehicle's front and rear brakes, respectively. These units are arranged as master and slave units; i.e., the power brake unit 10 controls unit 12. These units are of familiar construction with a pressure responsive wall separating each unit into a pressure chamber and a control chamber.

A brake pedal 14 is linked by a rod 16 to a control valve within the unit 10. The control valve monitors whether the vacuum in line 18 or the atmospheric pressure entering the filtered inlet 20 of a boot 22 shall be introduced to the control chamber of the units. A conduit 24 connects the control chambers of units 10 and 12.

Each of the units mounts master cylinders 26 and 28 to develop braking pressure transmitted to wheel cylinders (not shown) by conduits 30 and 32, respectively.

In order to maintain the pressure chamber of unit 12 under a similar pressure as that of the pressure chamber for unit 10 a vacuum line 34 is connected via a solenoid valve 36, which is arranged to be normally open to line 34, to the unit 12. The solenoid valve is arranged to have an atmospheric port with a filter 38 connected thereto.

My skid sensing unit 40 is shown in a preferred form to have a drive 42 connected to the associated vehicle's wheels, and an intertia means in the form of a flywheel 44 connected by a ratchet clutch 46 having a pin 48 and ratchet teeth 50. As seen, the inertia wheel 44 is biased by a spring 52 downwardly whereupon the pin 48 is in the bottom of the groove between the teeth 50. A plate 54 is affixed to the wheel 44 on the upper surface thereof, as shown. This plate is arranged to cooperate with a bearing 56 connected to a contact arm 58 pivoted, as at 60 and biased against a stop 62, as by a spring 64. The pivot 60 is grounded by a conduit 66.

In addition to spring 64, I have interposed a plunger 68 that is biased by a spring 70 whose loading is controlled by a mechanically positioned retainer 72. As seen, the plunger 68 is positioned such that limited movement of arm 58 is permitted before contact therewith. A lever 74 is pivoted to the sensing unit 40 such that a pawl 76 contacts the retainer 72, and a cable 78 is affixed to the lever, as at 80, to pivot lever 74 so that retainer 72 may move inwardly, as respects the outward position shown, to increase the loading of spring 70. As shown, the unit 40 is arranged such that little or no resistance to contact arm movement exists. In other words, a driver has set a remote control 82 to the icy road condition where surface adhesion is slight.

The contact arm 58 is provided with a contact point 84 arranged to mate with another contact point 86 upon upward displacement of arm 58. The upper point 86 is connected by a conduit 88 to a holding relay coil 90 at one end to which I have also connected a switch terminal 92, as by a conduit 94. To the other end of the coil I have connected a conduit 96 which terminates at each end in switch terminals 98 and 100. A switch arm 102 that is connected to a power source 104 is arranged to cooperate with terminal 98 and thereby connects the power source to the holding coil 90 and terminal 100 and can be activated as by the ignition switch of an automobile (not shown).

The switch terminals or contacts 92 and 100 are, as seen, adapted to be united in a dual switch having contact arms 106 and 108 that cooperate with the respective terminals 92 and 100. I show a bimetallic switch 110 connected to arm 108 and to the solenoid switch 36; whereas the other arm 106 is connected to a positioned controlled switch 112 dependent upon the position of the brake pedal 14 in that the switch plunger 114 is operatively connected to flat 116 of the brake pedal arm. Thus, once the brake pedal is depressed the plunger 114 follows through to close switch 112 and thereby close the circuitry powering the solenoid 36 until release of pedal 14 to open switch 112.

In operation a vehicle operator selects the position of lever 82 in accordance with the type of surface condition that is prevalent. He then turns on the ignition switch closing arm 102 with terminal 98 and places the lever 82 to increase or decrease resistance to movement of arm 58, in accordance with the observed road condition. The drive 42 is connected to the rear wheels of an automobile, for example, and whenever the wheels suddenly stop with energy remaining in wheel 44, the wheel will rise on the pins 48 due to the one-way ramp between the teeth 50. Thus, the contacts 84 and 86 are closed to activate the holding relay closing the dual switch and causing current to flow to the switch 110 which intermittently activates solenoid 36 to pulse the pressure differential in unit 12 and consequently the rear wheel brakes of a vehicle.

The inertia means will gradually lose energy and in order to prevent skidding when this has occurred, the position switch 112 will keep the circuit closed so long as the brake pedal 14 is depressed.

As is readily apparent to those skilled in the art to which my invention relates, the above description is but illustrative of one method of practicing my invention. The use with a single power unit is equally foreseen, as well as the use in aircraft, etc. I intend, rather, to be limited by the following claims only.

I claim:
1. For a power brake system including a power brake means, a means to modulate said power brake means to eliminate premature brake locking and consequent vehicle skidding, said modulating means comprising:
 a control mechanism consisting of an inertia means, a drive means for driving said inertia means, said drive means including a ratchet mechanism arranged to cause displacement of said inertia means upon cessation of said drive means before loss of the kinetic energy of said inertia means, a holding relay, a normally open switch forming a circuit in series with the coil of said holding relay and a power source, said switch being operatively connected to said inertia means such that displacement thereof will close said switch, a spring operatively biased between a movable retainer slidably contained in said control mechanism and said switch means to oppose displacement of said inertia means and consequent closing of said switch means, and a remote control means including a lever and a means connecting it to a bellcrank having a pawl adapted to vary the amount of opposition to displacement of said inertia means as said lever is operated to control the loading of said spring; and an electrical control system connected to said holding relay; said elecrical control system including, a normally open manually operable switch means connected to said power brake and connected in series with said holding relay and said power source, a pulsating switch device and solenoid valve means in series connection with said holding relay, said solenoid valve means operatively connected to control power fluid introduction to said power brake means and said pulsating switch device operates to close the switch therein whereby said solenoid is activated and deactivated in an intermittent manner; said switch activated by said power brake means functioning to continue this intermittent operation regardless of said inertia means until said power brake means is deactivated.

2. For a brake system including a brake actuator, a means to bring about a pulsating operation of said actuator to eliminate brake skidding, which means comprises:

a skid sensing unit having an electrical switch means including a pair of contacts that are spaced apart by a spring operatively connected to one of the contacts and to a movable spring retainer;

a means connecting said movable retainer to a remote control means to vary the position of said retainer and thereby control the force of said spring to be overcome before said contacts close on each other;

a holding relay in a series connection with said electrical switch means and a power source so as to be energized upon the closing of said contacts of said electrical switch means;

a normally open switch means including a first switch operably connected to said brake actuator to be closed thereby, said first switch being operatively connected to said holding relay in parallel with said electrical switch means via a second switch means controlled by said holding relay so as to maintain said relay energized regardless of the opening of the contacts of said electrical switch means until said first normally open switch breaks the circuit and a third switch operatively connected to said second switch having normally open contacts one of which is connected to said power source;

a pulsating means connected to the other contact of said third switch; and a valve means operatively connected to said pulsating means so as to be intermittently actuated thereby, said valve means arranged to control a supply of fluid to said brake system such that as said pulsating means actuates said valve means a fluid pressure in said brake system is reduced.

3. For a brake system including a brake actuator in accordance with claim 2 wherein said means connecting said movable retainer to a remote control means is characterized as a flexible link and said remote control means is a lever having variable positions so as to adjust said skid sensing units operating in accordance with conditions of the road being traversed by an associated vehicle incorporating the brake system.

References Cited by the Examiner

UNITED STATES PATENTS

| | | | |
|---|---|---|---|
| 2,159,778 | 5/1939 | Blush | 303—21 |
| 2,198,032 | 4/1940 | Farmer | 303—21 |
| 2,225,315 | 12/1940 | McCollum | 303—24 X |
| 2,408,203 | 9/1946 | Eames | 303—24 X |
| 2,966,564 | 12/1960 | Cunningham | 200—61.46 |
| 3,022,115 | 2/1962 | Hill et al. | 303—24 |
| 3,089,734 | 5/1963 | Jankus | 303—61 X |
| 3,159,729 | 12/1964 | Stelzer et al. | 200—61.47 |

EUGENE G. BOTZ, *Primary Examiner.*